Figure 1:
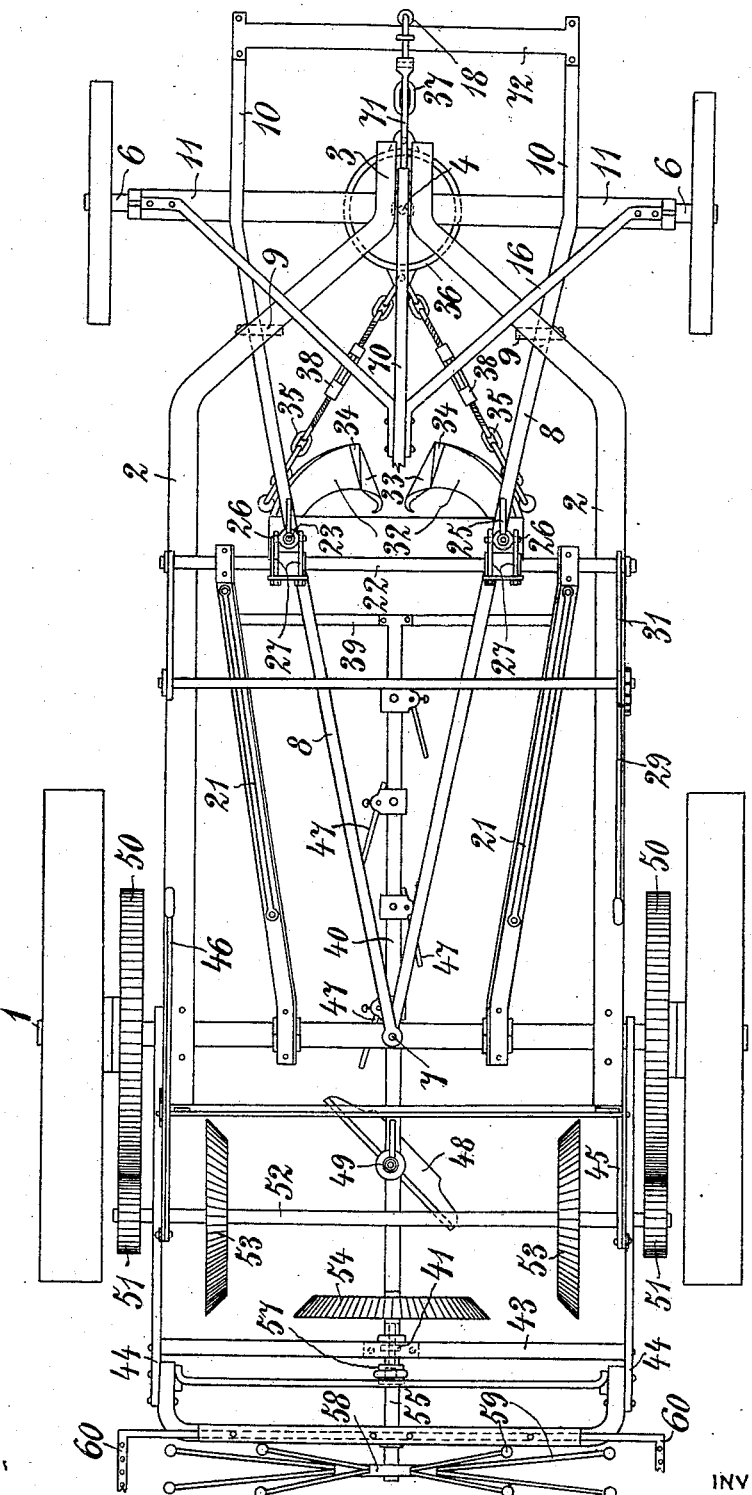

O. N. FRANKMAN.
MACHINE FOR UNEARTHING BEETS.
APPLICATION FILED NOV. 1, 1906.

928,594.

Patented July 20, 1909.
4 SHEETS—SHEET 1.

WITNESSES:
W. H. Berrigan.
Alfred R. Anderson.

INVENTOR,
OLOF NILSSON FRANKMAN
by Van Deventer & Schurmann
ATTORNEYS

O. N. FRANKMAN.
MACHINE FOR UNEARTHING BEETS.
APPLICATION FILED NOV. 1, 1906.

928,594.

Patented July 20, 1909.
4 SHEETS—SHEET 2.

WITNESSES:

INVENTOR,
OLOF NILSSON FRANKMAN,
by
ATTORNEYS

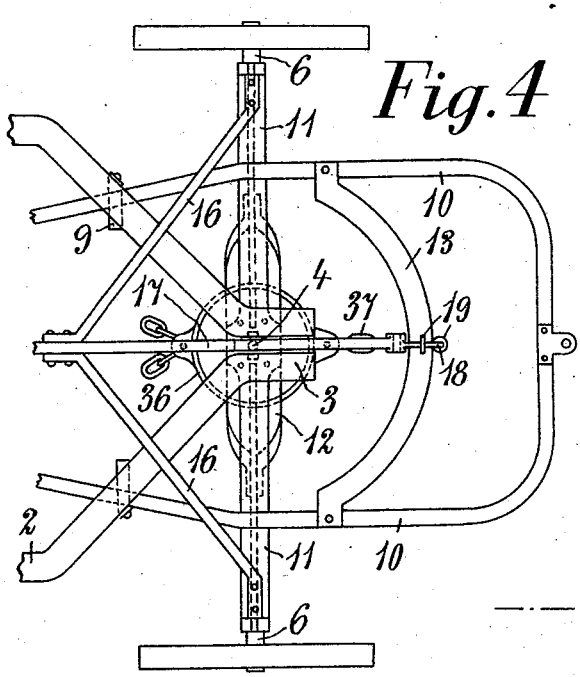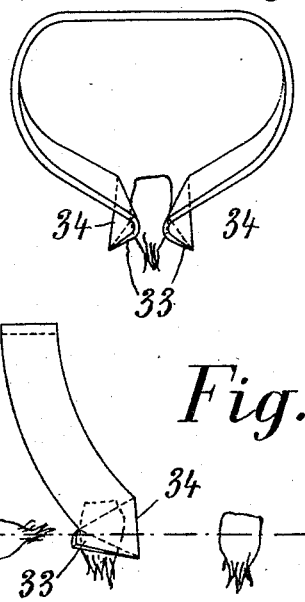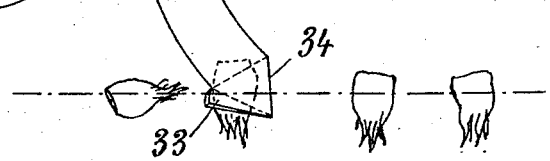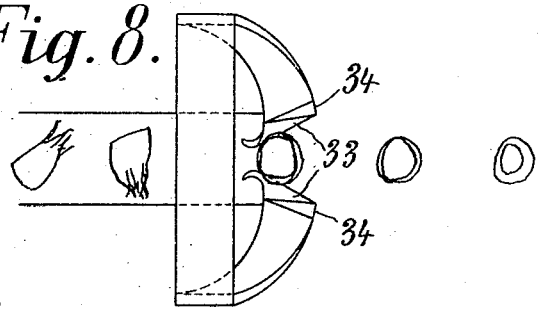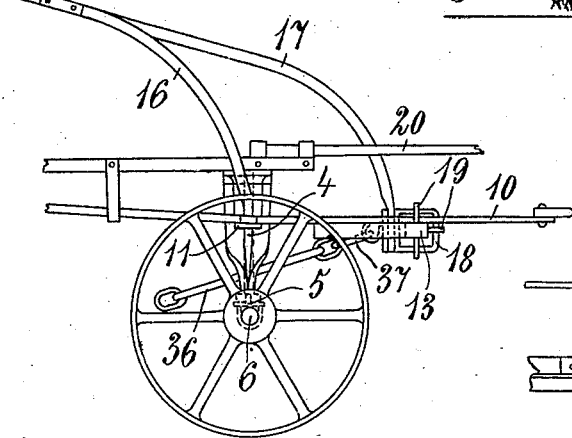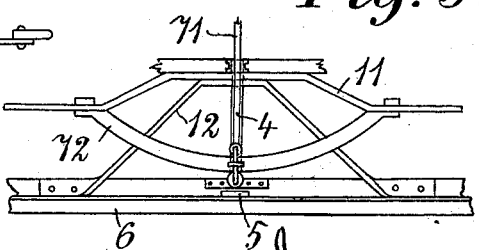

O. N. FRANKMAN.
MACHINE FOR UNEARTHING BEETS.
APPLICATION FILED NOV. 1, 1906.

928,594.

Patented July 20, 1909.
4 SHEETS—SHEET 4.

Witnesses

Inventor,
OLOF NILSSON FRANKMAN,
BY
Attorney.

UNITED STATES PATENT OFFICE.

OLOF NILSSON FRANKMAN, OF MARIEBERGSGÅRD, MARIEBERG, SWEDEN.

MACHINE FOR UNEARTHING BEETS.

No. 928,594.        Specification of Letters Patent.        Patented July 20, 1909.

Application filed November 1, 1906. Serial No. 341,515.

*To all whom it may concern:*

Be it known that I, OLOF NILSSON FRANKMAN, land-steward, a citizen of the Kingdom of Sweden, residing at Mariebergsgård, Marieberg, Sweden, have invented a new and useful Machine for Unearthing Beets; and I do hereby declare the following to be a full, clear, and exact description of the same.

The present application relates to a machine by the aid of which it is possible to unearth beets from the place where they are growing, free them of the adhering earth and place them in rows in such a manner that they may be gathered without further treatment, ready for delivery to sugar factories and the like. It is presumed however that the beets have been previously freed from leaves and tops by a special machine.

Figure 2:
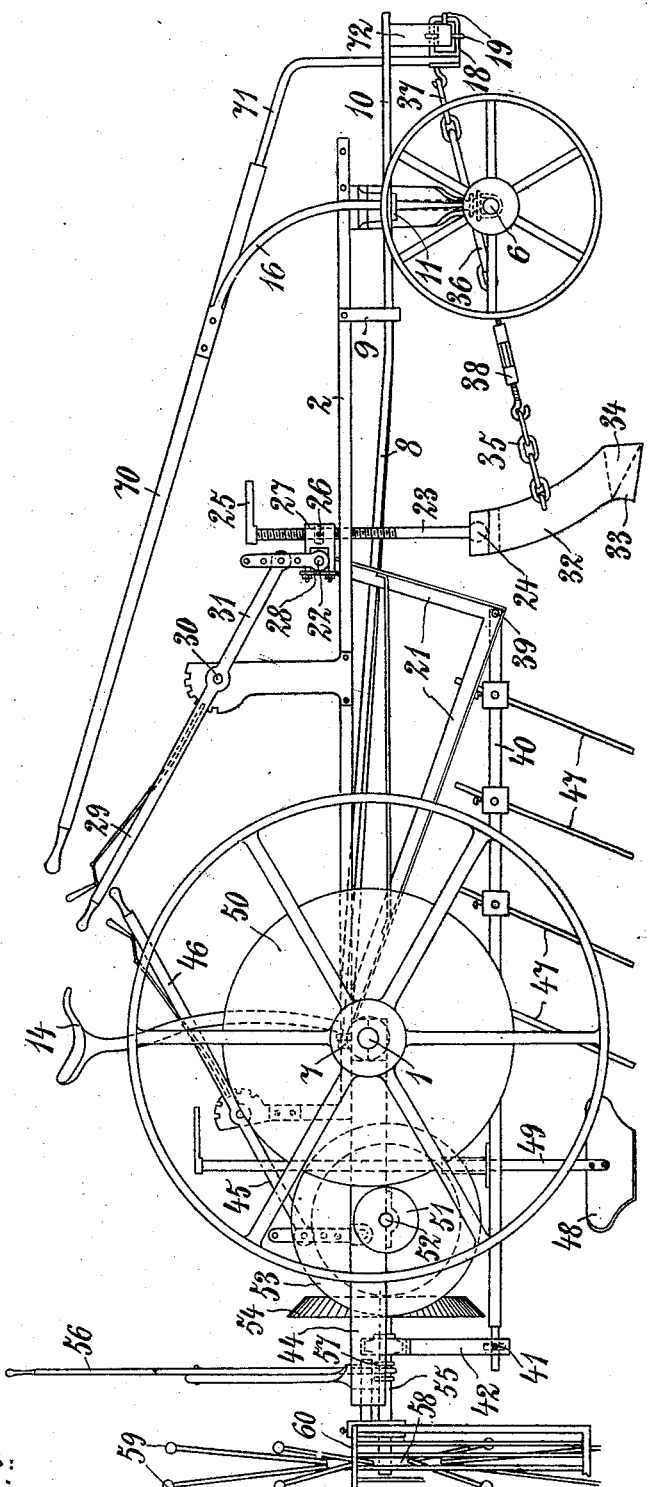
Figure 9:
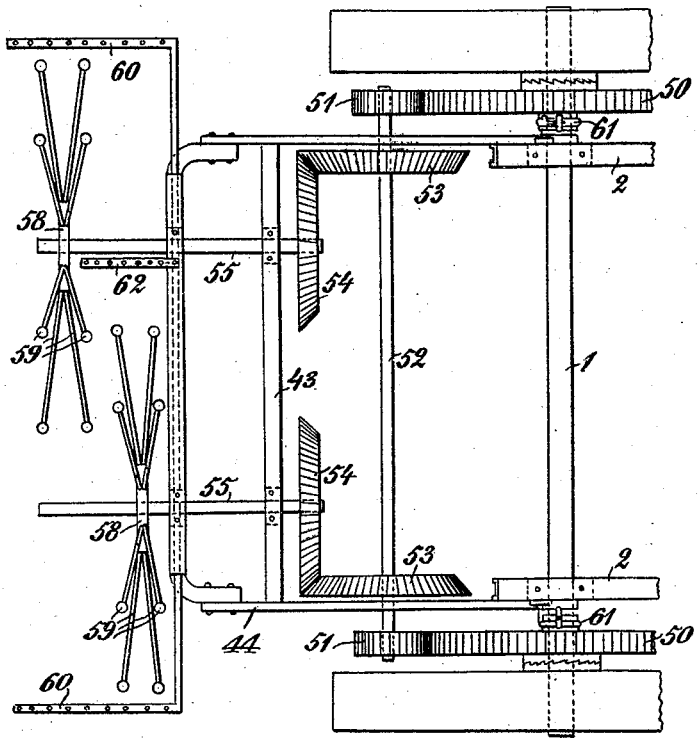

The invention is shown in the drawing as follows:

Figure 1 shows a form of the machine seen from above; Fig. 2 the same seen from the side; Fig. 3 a part of the machine especially illustrating the guiding apparatus seen from the front; Fig. 4 is a plan view of an altered guiding apparatus; Fig. 5 the same seen from the side; Fig. 6 the so-called beet-tongs seen from behind; Fig. 7 the same seen from the side, and Fig. 8 the same seen from above; Fig. 9 a part of the machine with an altered detail-device seen from above, and Fig. 10 the same seen from the side.

The machine, which is supposed to be drawn by a pair of horses, rests on two pairs of wheels. The axle 1 of the hind-wheels is in fixed connection with the machine-frame 2, the side pieces of which, at their foremost parts are directed horizontally toward each other and form a fork 3. This fork is bolted to an upright 4, which by a joint 5 is rotatably connected with the axle 6 of the front wheels which may, by these means, be moved freely to the sides together with the latter.

The device for drawing the machine comprises a shaft formed like a frame. The backward turning ends of this traction-frame are hooked on a hook 7 in the center of the axle 1 of the hind-wheels from which the parts 8 of the frame stretch forward, slightly obliquely, outwardly and downwardly. These parts 8 are engaged at various places by clasps or hoops 9, opening inwardly and fastened on the machine-frame 2 in such a manner that the traction-frame is only allowed to turn very little around the hook 7 in any direction, which improvement, being peculiar to this machine, will cause the guiding to be accomplished very easily and securely. The frame-parts 10 which are nearly horizontal and parallel with the middle-line of the machine rest loosely on the outer end of a cross-rail 11, which is bent slightly upwardly in the middle and fastened by another cross-rail 12, the middle of which has a still sharper upward bend, to the axle 6 of the front wheels as shown in Fig. 3. On its front piece which is squarely in the direction of the pull, the frame is supplied with an eye for fastening the hook of the drawing shaft. To the frame-part 10 is fastened a guiding-rail 72, for the pulling hook of the beet-tongs.

The guiding of the front-wheels with their axle and the beet-tongs separately is accomplished by the conductor of the machine from a seat 14 (Fig. 2) by the aid of a guiding-rod 70 and two arms 16 bolted to the same, the foremost ends of rod 16 being fastened to the cross-rail 11 on its outside opposite to the places on which the parts 10 of the traction-frame rest.

The guiding rod is divided into two separate parts and the part 70, which serves for guiding the front-wheels with their axle is hollow, and forms a case in which a separate guiding rod 71 (for the beet-tongs) can turn freely when a handle fastened on the said rod behind the case 70 is operated on, while the rod cannot be shifted in the case. The foremost part of the rod 71 is fastened to a shackle 18 running on rollers along a guiding-rail 72; the rail is bent downward, as shown in Fig. 3. By the aid of this special guiding-rod 71 it is possible to move the beet-tongs to the sides to such an extent as may be necessary on account of the irregularities of the beets quite independently of the guiding of the machine taken as a whole. In place of the rod 71, another form (as 17, Fig. 5) may be employed, and a curved guiding-rail (13, Fig. 4) may be employed instead of the bent rail 72. In the form shown in Figs. 4 and 5, the foremost part 17 of the guiding-rail 15 is bent downward and fastened to a closed drawn-shackle 18 placed loosely around the guiding-rail 13 which is bent into circular shape with its center above the middle of the front-wheel axle and on which three rollers 19, placed on the shackle roll during the movement of the shackle along the guiding-rail. To the shackle 18 is fastened the draw-chain of the beet-tongs and these may consequently be moved easily from side to side as required in order to make the tongs seize properly around the beets.

The beet-tongs that serve for unearthing the beets are hung in a carrying frame the side pieces 21 of which at the back are firmly connected with hoops inclosing the axle 1 of the hind wheels on which these hoops may turn but are unable to travel. The side pieces consist of two parts which form a downward turned angle and carry in front a cross-axle 22 to which the beet-tongs are connected by the aid of two adjusting-screws 23 supplied below with nearly bullet-shaped heads 24 resting in corresponding beds in the upper part of the beet-tongs. These will consequently be lifted or lowered when the adjusting-screws by the handle 25 are screwed upward or downward in their nuts 26. Each of these nuts is supplied with two horizontal cross-bolts and inclosed by two fork-shaped tightening pieces 27 which are firmly screwed to a bed 28, that may travel on and turn around the cross-axle 22. The beet-tongs may thus, while remaining in the level imparted to them by the adjusting-screw, move freely to the sides when their draw-shackle is traveling along the guiding-rail 13 and thereby be made to seize properly around each beet in spite of any irregularity in the beet-rows.

Partly through the way the beet-tongs are fixed in the adjusting-screws 23, partly through the adjusting-screws being movably fixed in the nuts 26, partly through the way the beet-tongs are connected with the draw-shackle 18 and partly through the fastening of the carrying-frame 21 on the axle of the hind wheels do the beet-tongs during the work get the necessary freedom of movement in the longitudinal direction of the machine. By this the result is attained that even very long and firmly sitting beets are unearthed without breaking. It happens this way; the considerable resistance produced when the beet-tongs seize firmly sitting beets will cause the forward movement of the tongues to be, as it were, impeded and the tongs to be bent backward. This, we might call it the elasticity of the tongs, will cause a slower and surer unearthing of such exceptionally firmly sitting beets.

In order to enable the beet-tongs to pass inequalities in the ground the driver may, independently of the level given to the tongs by the adjusting-screws 23, from his seat 14 lift the front part of their carrying-frame in turning it on the axle of the hind wheels by a handle 29 which may be locked in various positions on an upright on one of the side-pieces of the machine frame 2. The handle is in firm connection with its axle of rotation 30 which has its other bed in a corresponding upright on the other side of the machine-frame and is supplied at each end with a rigid arm 31 in movable connection with the end of the axle 22 of the carrying-frame.

The beet-tongs 32 consist of a steel-rail which may suitably be 2 cm. thick, 10 cm. broad on top and a little broader below. Their peculiar form which is carefully adapted to the double work to be accomplished namely the removal of the earth on both sides of the beet-rows and the unearthing of the beets is shown in Figs. 6–8. Seen from behind the greater part of the tongs is semicircular and below they are bowed forward which makes them resemble a somewhat twisted cylinder. This form is expedient for preventing beet-tops, beets and earth from accumulating in front of the tongs, and also prevents an injurious springiness of the lower ends of the tongs which each have a flat cutting-plane of a triangular shape and two jaws formed nearly like half-cones. The cutting planes have an incline corresponding to the shape of the beets and their task is to cut away the earth on both sides of the beet-rows in a suitable depth and as close to the beets as possible in order to leave the beets sufficiently free for the jaws to seize and in order that only the earth thus left around the beets by the knives of the beet-tongs has to undergo treatment by the other devices of the machine. In front the knives present an edge 34 inclining slightly forward as shown in Fig. 7 to facilitate the tongs cutting into the ground. The lowest point of the edge of the knife 34 also forms the point of the semi-conical jaw. The conical planes of the jaws turn against each other and with their bases backward. They are placed thus against each other in order to enable them to seize as gently around the beet as is necessary to allow the beet during the unearthing process to slide upward and forward and thereby avoid being broken or otherwise damaged which has not been avoided by the use of any other machine.

The axes of the cones are nearly parallel with each other thus leaving the points of the cones at a greater distance from each other than the bases of the same; the distance may suitably be 2—3 and 10 cm. respectively. The lower generators incline imperceptibly forward.

The pull on the beet-tongs is effected by two chains 35 fastened rather low down on the sides of the tongs while they are connected a little behind the axle of the front-wheels by a large ring 36 encircling the upright 4 in order that this may not impede the chains and to avoid the considerable loss of energy happening when the tongs knock violently against the ground. To the ring 36 in front of the upright is affixed another shorter chain 37 hooked on a hook on a drawhoop 18 which is movable along the guiding-rail 13. By this device the pull on the beet-tongs works so that the beet-tongs are prevented from thumping in the ground to the detriment of the regularity of the work and an easy pull. The two chains 35 will tend to force the jaws of the tongs suitably together about the beet. In order to adjust the position of the beet-tongs in the longitudinal direction of the machine there are inserted in each of the chains 35 two joints with screw-worms in mesh with an adjusting muff 38 with screw-threads cut the opposite way on both ends so that the chain may be shortened or lengthened by turning the muff either way.

Just behind the beet-tongs is a device for a preliminary cleaning of the unearthed beets. In the carrying frame 21 of the beet-tongs and revolvingly connected with the same is placed a cross-bar 39 to the middle of which is bolted a horizontal bar 40 in the longitudinal plane of the machine, the hindmost part of which is movably inserted into a short cross-piece 41 rotatingly inserted into two supports 42. These supports are firmly connected with a cross-bar 43 in the hindmost frame 44 of the machine. This frame rests on the axle 1 of the hind-wheels and can turn on the same but not travel on it and the part behind the axle is connected by arms 45 with the machine-frame 2 in a manner similar to that specified for the carrying-frame of the beet-tongs. The driver will thus from his seat 14 be able to lift or lower the hind part of the frame 44 by lifting or lowering the handle 46.

The way the bar 40 is placed as specified above allows it to move a little lengthwise during the motion upward and downward of the frames 21 and 44 with which its ends are connected. To the bar 40 are fastened a number of cleaning-pins 47 which may be separately adjusted in height and incline a little backward while they are placed a little to this or that side alternately. When the machine moves forward these pins, which follow the trench in the ground made by the knife edges of the beet-tongs, will pass along the beets that have been unearthed and scrape off the greater part of the earth adhering to them. The beets will immediately afterward be carried over the edge of the trench and placed on either side of the same according to requirement by a bent plate 48 the handle of which 49 is fastened to the bar 40 close behind the cleaning pins. The plate 48 is for this purpose supplied with two laps beveled in opposite directions so that the lap turning backward will work in a manner like a plow-iron and carry the beets it meets upward to a certain side when the plate is adjusted to a suitable level by lifting or lowering the handle 49 in its bed on the bar 40. The handle is rotatingly fixed in its bed which makes it possible to turn either of the laps of the plate backward in order to get the beets placed at any side of the trench according to requirements and to facilitate the subsequent work as much as possible.

Connected with the hindmost frame 44 of the machine is a device for cleaning the beets more perfectly of the adhering earth and for throwing them to one side. The movement emanates from the hind-wheels together with which are rotated two cog-wheels 50 in mesh with pinions 51 fastened on an axle 52 having its bed on the frame 44. By the rotation of the hind-wheels a rotary motion is thus imparted to two conical cog-wheels 53 on the axle 52. With due regard to the wrenching when the machine has to be turned one of the cog-wheels 50 may be arranged to allow of uncoupling from the corresponding hind-wheel. Each of the wheels 53 can be made to mesh with a conic cog-wheel 54 fixed on the longitudinal axle 55 the beds of which are movably latitudinally on the hindmost part of the machine frame 44 and on the above mentioned cross-piece 43 in that frame in such a manner that the axle 55 by the aid of a handle 56 working on a coupling 57 may be shifted so much to either side that the wheel 54 is brought in mesh with one of the wheels 53. A round plate 58 on the end of the axle 55 will thereby be put in a rotary motion in one direction or the other and the forks 59 affixed to this plate will then during their comparatively quick rotation throw the beets they catch, and which have been previously placed to the side they are working by the plate 48, against a screen 60 placed vertically in the longitudinal direction of the machine and which may be adjusted to remain at a greater or smaller distance from the center-plan of the machine. In this way the earth is shaken from the beets and these will fall down at the desired distance from the beet-row in question. The forks 59 are supplied at their ends with knobs in order that they may not damage the beets.

Figure 10:
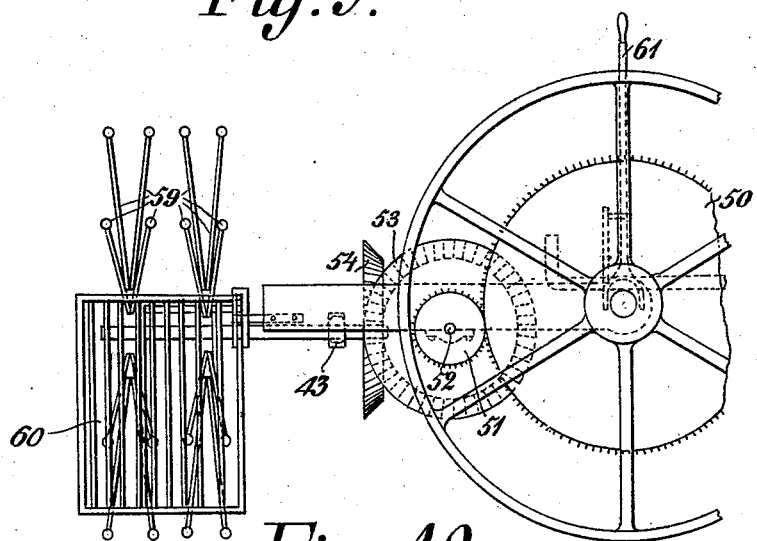

A somewhat different form of the last specified device is shown in Figs. 9 and 10. The cog-wheels 50 are also here on the axle of the hind-wheels but connected with these by couplings of free choice so that the cog-wheels 50 can be made to rotate with the hind-wheels or to remain stationary by the aid of the corresponding handles 61 which must be worked simultaneously. Instead of a single conic cog-wheel the device consists of two which are constantly in mesh with the cog-wheels 53 respectively and affixed each to its separate longitudinal axle 55 in connection with the hindmost frame 44 of the machine. There are also two separate plates 58 with forks 59 and each plate is made in such a way that it can be shifted by hand on its axle 55. The two plates 58 rotating in different directions may thus be shifted to different distances from the back of the frame 44 and the forks on the foremost plate will then throw the beets against a center-screen 62. Having fallen down from this the beets will be thrown against one of the outer screens 60 by the forks on the other plate. By this device a more perfect cleaning of the beets is effected beside which another benefit is derived therefrom through the ground being leveled as the earth removed by the blade 48 is again carried back into the trench produced by the beet-tongs and the blade 48 by the forks.

The machine specified with the particularly constructed and fitted beet-tongs may also if preferred for instance for smaller beet areas be constructed less elaborately by leaving out the hindmost machine-frame 44 the bar 40 and the cleaning devices in connection with these, the blade 48 etc. The beets will by this plainer machine be unearthed in the same careful manner but be left lying or standing in the place where they are dropped by the beet-tongs or in the place where they grow.

What I claim and desire to secure by Letters Patent of the United States, is:

1. A machine for unearthing beets, comprising a wheeled carriage provided with a frame above the axle of the wheels of said carriage, and a tong-shaped part disposed and formed to cut away the ground at both sides of the beet rows and to unearth the beets, in combination with means to remove the adhering earth from the unearthed beets and for carrying such beets to one side of the machine.

2. A machine for unearthing beets, comprising a wheeled carriage provided with a frame having front and rear axles, a tong-shaped part disposed and formed to cut away the ground at both sides of the beet rows, and to unearth the beets, means to remove adhering earth from the unearthed beets, and for carrying such beets to one side of the machine, in combination with a draw-frame resting loosely on a rail firmly connected with the axle of the front wheels of the machine, hooks for preventing the machine frame from turning, hooks for securing the draw-frame to the axles of the rear wheels of the machine, the foremost part of the machine frame being provided with a curved guiding rail, and a hoop resting on said guiding rail and connecting with the tong-shaped part aforesaid.

3. A machine for unearthing beets, comprising a wheeled carriage provided with a frame above the axles of the wheels of said carriage, a driver's seat for said carriage, and a tong-shaped part disposed and formed to cut away the ground at both sides of the beet rows and to unearth the beets, in combination with a front axle provided with wheels and rotatably connected with the machine frame, a guiding rod connected with said axle and extending backwardly to the neighborhood of the driver's seat and a connection between said rod and the tong-shaped part aforesaid.

4. A machine for unearthing beets, comprising a wheeled carriage provided with a frame above the axles of the wheels of said carriage, a driver's seat for said carriage and a tong-shaped part disposed and formed to cut away the ground at both sides of the beet rows and to unearth the beets, in combination with a front axle provided with wheels and rotatably connected with the machine frame, a hollow guiding-rod and a part rotatably fitting in the hollow thereof and connected with said axle, said rod extending backwardly to the neighborhood of the driver's seat and a connection between the forward end of said rod and the tong.

5. A machine for unearthing beets, comprising a wheeled carriage provided with a frame above the axles of the wheels of said carriage and beet-tongs consisting of a rail bent in the shape of a half-cylinder the lower ends of which are formed in such a way that they present two cutting planes supplied with knife-edges 34 for cutting away the earth on both sides of the beet-rows and of two nearly semiconical jaws 33 with their points which are below turned forward and the conical planes turned toward each other in such a way that their reciprocal distance at back is considerably less than in front to allow the beets to slide upward between the conical planes during the process of unearthing.

6. A machine for unearthing beets comprising a wheeled carriage provided with a frame above the axles of the wheels of said carriage provided at the top with nearly bullet-shaped beds for the correspondingly formed lower ends of two adjusting-screws 23 that serve for adjusting the tongs in height and the nuts of which may turn a little around horizontal cross-axles and are supplied with a long cross-bar 22 forming part of the carrying-frame 21 of the beet-tongs which at back turn on the axle 1 of the hind-wheels and is kept in its different positions by the levers 31 that can be worked from the driver's seat and rotating axis of which is in firm connection with the machine-frame 2.

In testimony whereof, I have signed my name to this specification in the presence of two subscribing witnesses.

OLOF NILSSON FRANKMAN.

Witnesses:
   H. FLEISCHER,
   F. PETERSEN.